Aug. 23, 1966                J. R. ERWIN                3,267,668
                    CONVERTIBLE RADIAL FLOW FAN
Filed June 25, 1964                            2 Sheets-Sheet 1

INVENTOR.
JOHN R. ERWIN
BY John F. Cullen
ATTORNEY

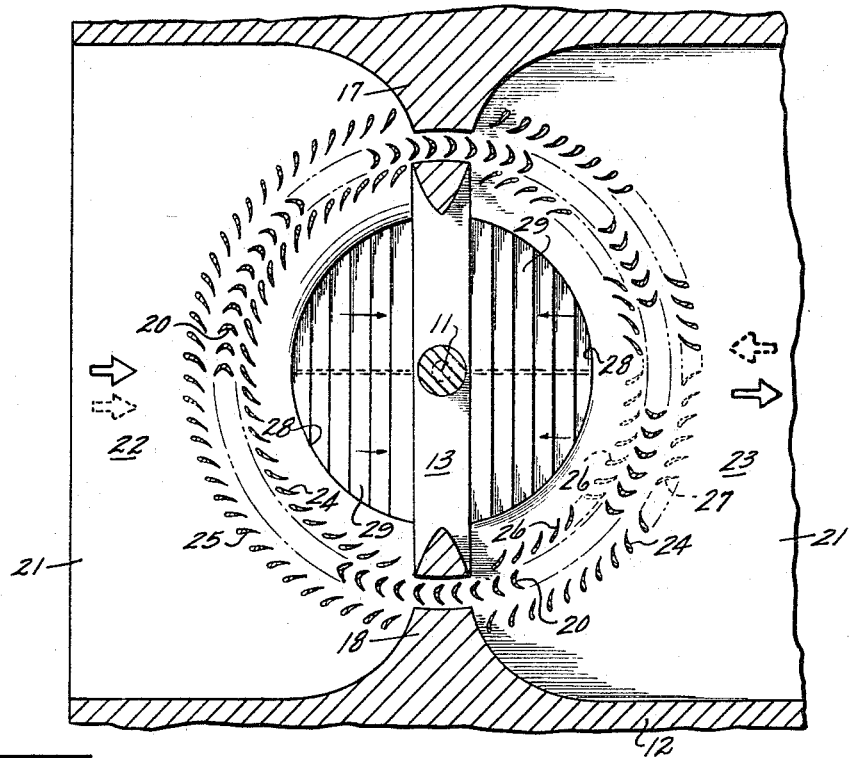
Fig. 3
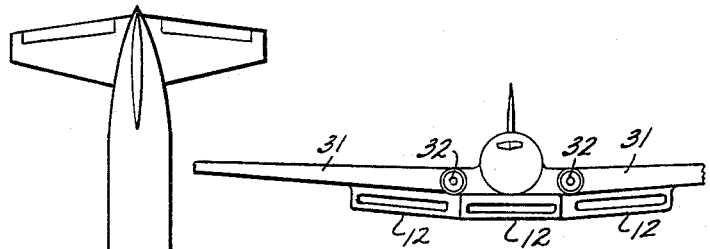
Fig. 5
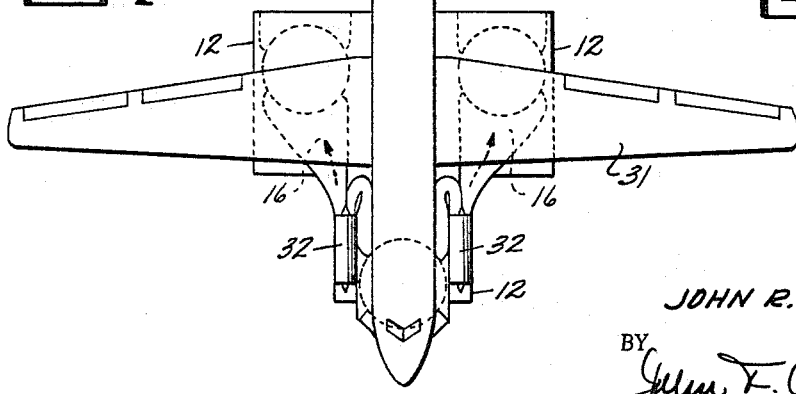
Fig. 4
INVENTOR.
JOHN R. ERWIN
BY
ATTORNEY

United States Patent Office 3,267,668
Patented August 23, 1966

3,267,668
CONVERTIBLE RADIAL FLOW FAN
John R. Erwin, Cincinnati, Ohio, assignor to General Electric Company, a corporation of New York
Filed June 25, 1964, Ser. No. 378,015
8 Claims. (Cl. 60—35.54)

The present invention relates to a convertible radial flow fan and, more particularly, to such a fan for attachment to an aircraft for vertical and cruise propulsion.

In VTO aircraft of the so-called lift fan type, it is customary to use a fan for the movement of large quantities of air at low velocities for propulsion. Such a fan may be a tip turbine fan of the type generally known as a lift fan and one which may be wing mounted or fuselage mounted and driven by hot exhaust gases from a remote gas generator or it may be a similar type fan that may be rotated for the lifting portion of the mission and then turned so that its axis of rotation is horizontal for cruise. Inherently, a lift fan is a high flow, low pressure ratio device. This type of device is required for high thrust augmentation for lifting the aircraft off the ground. To move the aircraft through the air at high speeds, a low flow, high pressure ratio fan is required for efficient high speed forward flight. These differing conditions for the two phases of operation are generally mutually exclusive in the same device.

Fans are used for both modes of operation. The air stream is directed downwardly by a vectoring arrangement for the VTO portion and then vectored rearwardly for cruise. However, the same fan is still faced with the desired requirements of a high by-pass ratio low pressure device for lift and a low by-pass ratio high pressure device for high speed flight propulsion.

It is desired to provide a convertible fan that may meet both objectives of high flow, low pressure ratio for lift and low flow, high pressure ratio for high speed cruise. Such a device, that might be attached to existing aircraft, would be of value if it would not require a complete new airframe designed around a propulsion system or vice versa.

The main object of the present invention is to provide a convertible radial flow fan that may be attached to an aircraft which fan is intended to provide high flow, low pressure ratio vertical lift and, by a shifting or a convertible arrangement, also provide thrust at low flow and high pressure ratio for high speed cruise.

It is a further object of the invention to provide such a radial flow fan wherein the air enters the forward half of of the fan periphery and the rear half of the fan periphery and discharges downwardly through exit louvers for VTO operation.

Another object is to provide such a fan that may be convertible, or shifted, so that the flow may pass through the fan entering the front and leaving through the rear thus undergoing two stages of compression before it is discharged for horizontal thrust.

A further object is to provide that the fan is adapted to be mounted for rotation about an axis vertical to the aircraft to present a small frontal area and be conveniently driven by a tip turbine.

Another object is to provide such a device wherein the combination fan and turbine also provides the effect of a two stage turbine with a single peripheral row of turbine buckets.

A further object is to provide such a device wherein the main thrust is obtained from the fan stream in both vertical and cruise operation and the overall device requires no flow through any airframe structure so that the entire device may be attached to existing conventional airframes to convert them into vertical take-off aircraft.

Briefly stated, the invention is directed to a convertible radial flow fan that may be attached to an aircraft for vertical and cruise propulsion and comprises a disk supported for rotation on an axis vertical with respect to the aircraft. The disk is rotated conveniently by a tip turbine on the upper periphery thereof and the lower periphery contains vertically attached impulse compressor blades whose axes are parallel to the axis of rotation of the disk. A stationary casing encloses the disk and has diametrically opposed segment inlet and outlet passages or openings to the fan blading. Outlet guide vanes are provided in both passages with the vanes in the outlet passage being movable. Inlet movable guide vanes are provided at least in the outlet passage so that the fan provides a cross flow two stage compression from the inlet passage to the outlet passage and exhaust for horizontal thrust. For vertical operation, a louver controlled vertical opening is provided in the casing centrally below the disk and both inlet and outlet guide vanes in the outlet passage are movable more than 80° to reverse them so that the outlet guide vanes become inlet guide vanes and vice versa whereby the air flows radially inwardly peripherally around the fan for single compression and discharge through the vertical opening to provide vertical thrust. The general arrangement provides large air inlet and air outlet passages that may extend between 90 and 180° around the disk periphery.

While the specification concludes with claims particularly pointing out and distinctly claiming the subject matter which is regarded as the invention, it is believed the invention will be better understood from the following description in connection with the accompanying drawing in which:

FIG. 3 is a cross-sectional view on the line 3—3 of FIG. 1 illustrating the fan guide vanes;

FIG. 4 is a plan view of the application of the invention to an aircraft; and

FIG. 5 is a partial front view of the arrangement of FIG. 4 illustrating the small frontal area of the convertible radial flow fan.

Figure 1:
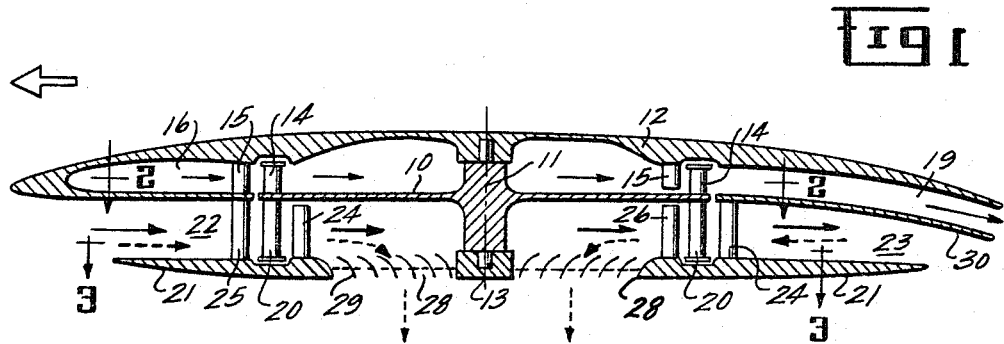
FIG. 1 is a diagrammatical cross section of the convertible radial flow fan of a particular type as it might be applied to a wing.

Referring first to FIG. 1, the instant invention is shown is it might appear in a preferred form to present the smallest frontal cross sectional area. It should be appreciated that the instant fan device is driven by a gas generator located elsewhere in any suitable manner and not illustrated since it is not necessary for the understanding of the present invention. Suffice to say that hot exhaust gas is available from a prime mover and this exhaust gas is used to drive the instant invention. Also, it will be appreciated, as the description proceeds, that the radial flow fan may be driven other than by the convenient tip turbine arrangement shown although the arrangement shown is preferred. The arrangement will thus be described, for ease of illustration, in connection with a wing mounted fan in which it is intended to be a separate package suspended below the wings or the fuselage as illustrated in FIGS. 4 and 5.

The convertible radial flow fan that is attached to the aircraft includes a disk 10 of any suitable diameter and the disk is supported for rotation on an axis 11 that is vertical with respect to the aircraft to which the device is to be attached. In the present case, the axis 11 may be supported from a piece of structure 12 that may or may not be part of the aircraft. In order to support axis 11 satisfactorily of course, suitable struts and bearings 13 will be provided. It is to be understood that 13 may represent an end view of the strut since, for stiffness, it may be required but it is not important to the understanding of the invention. In order to rotate the disk 10 it is convenient, although not necessary, to provide means such as a tip turbine system shown. This comprises a peripheral row of turbine buckets 14 as shown in cross section in FIG. 2, that is preceded upstream by nozzles 15 for proper direction of exhaust gas into buckets 14. Because the hot gas flow is always in the same direction there is no requirement for any movable vanes in the turbine stream. As shown in FIG. 1, the hot exhaust gas from a gas generator not shown, may enter a scroll 16 within structure 12 and the scroll may be extended substantially around the forward periphery of the disk as shown in FIG. 2.

Figure 2:
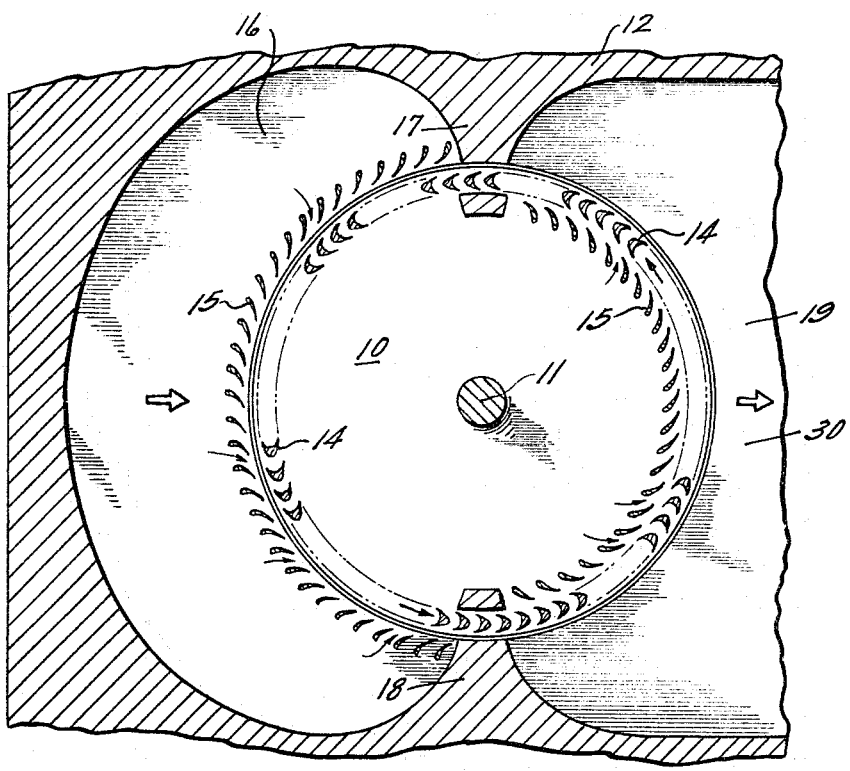
FIG. 2 is a cross-sectional view on the line 2—2 of FIG. 1 illustrating the turbine nozzle and bucket arrangement.

As shown in FIG. 2, suitable dividers 17 and 18 are provided to separate the inlet from the outlet. With this arrangement then the single peripheral row of turbine buckets 14 provides a two stage turbine wherein the flow passes from the forward half of the dividers 17 and 18, through the forward turbine nozzles 15 and buckets 14, and across the center area above the disk 10. The flow then passes through the rear nozzle blades 15 and turbine buckets 14 and out discharge duct 19. Thus, a single row of turbine buckets 14 provides the equivalent of a two stage turbine.

In order to obtain the high augmentation, high mass flow and low pressure ratio air flow, a convertible radial flow fan of the instant invention is provided conveniently on the opposite side or bottom of disk 10.

Referring now to FIGS. 1 and 3, air compression is provided by a peripheral row of vertically attached impulse compressor blades 20 on the disk. For reasons that will be apparent, it is essential that the blades 20 be impulse compressor blades which are designed so that the flow may pass either radially inward or radially outward through them. This results in energy being added to the air in the case of impulse blading by means of a change in velocity and no change in static pressure. Thus, there is no pressure change across the blades 20 but merely a velocity change. As a result, the blades operate equally well in either direction.

In order to provide a path for air flow through the fan, a stationary casing 21 encloses the disk and is designed to provide diametrically opposed segment-like air inlet passage 22 and outlet passage 23 as indicated in FIG. 1 and the air flow is as shown generally by the arrows in FIG. 3. It may be seen then that each segment passage 22 and 23 may extend over a large periphery, preferably between a 90° and 180° portion of the disk as shown.

In order to guide the air, as compressed by blades 20, there are provided outlet guide vanes 24 conveniently mounted on the casing 21 on each side of the periphery in the passages. Since the guide vanes in the outlet passage 23 operate differently, depending on whether cruise or VTO is desired, they will first be described as for cruise operation.

During cruise operation, outlet guide vanes 24 operate as such on either side of axis 11. During such operation, the air, as shown by the solid arrows in FIGS. 1 and 3, entering inlet passage 22 is compressed by impulse blades 20 at the left of FIG. 1 and is constrained to pass diametrically across the fan to be compressed again in the same row and by the same blades 20 in the outlet passage 23 portion of the fan. The outlet guide vanes 24 then direct the two stage cross flow compressed air through outlet passage 23 for horizontal thrust. Since the air for such thrust is always moving to the right, inlet guide vanes 25 and 26 may be required on the left and right sides respectively of axis 11. They are required at the outlet passage 23 and may improve the flow in the inlet passage 22 at 25 as an alternate arrangement.

The cruise operation just described provides a lower mass flow of air with a small frontal area device with two stage compression as well as two stages of turbine and the total mass flow of both the turbine and the fan exits out duct 19 and passage 23 respectively with the large horizontal thrust being obtained from the air flow through outlet passage 23. In this arrangement a lower mass air flow is obtained since air is being taken aboard through inlet passage 22 only and exhausted through outlet passage 23. Because of the two stage compression it is exhausted at a high pressure ratio which is exactly that which is desired for efficient high speed forward cruise flight—lower flow and high pressure ratio.

For the vertical mode of operation, a mutually exclusive set of conditions is required—very high mass flow and low pressure ratio for high thrust augmentation to lift the aircraft vertically. In order to provide this mode of operation the fan is converted or in effect, "shifts gears." This is accomplished by making both sets of guide vanes, inlet guide vanes 26 and outlet guide vanes 24 in the outlet passage 23 movable about a vertical axis to reverse their function of operation. As shown in FIGS. 1 and 3 and by the dotted arrows representing the air flow, each outlet guide vane 24 may be rotated by suitable mechanism substantially completely about to the dotted position 27 so that it then becomes an inlet guide vane. Similarly, each inlet guide vane 26 may be similarly rotated as shown dotted to become an outlet guide vane. In either case, to operate properly, they must be movable more than 80° to reverse their function. It is to be remembered that blades 20, being impulse compressor blades, operate equally well in either direction. In this mode of operation then, outlet passage 23 becomes an inlet passage for the radial inflow of air which is compressed in blades 20. With now two inlet passages 22 and 23, both extending around a substantial portion of the fan, and with the peripheral row of impulse blading 20 compressing the air only once, it can be seen that a large mass flow of low pressure air is now taken in radially around a large portion of the fan.

In order to make use of this air that is taken in, for vertical operation there is provided a vertical opening 28 in casing 21 and this opening is disposed centrally below the disk as shown in FIGS. 1 and 3. Suitable louvers diagrammatically shown as 29 are provided to control the opening so that it is open as shown in FIG. 1 or may be closed off as shown dotted for the horizontal cruise position as described above. Any suitable louvered opening conventionally actuated may be employed and the details are not necessary for the understanding of the invention herein.

Thus, the single stage compression large area inlet provides a high mass flow, low pressure ratio, high augmentation vertical lift. The transmission or gear shift convertible arrangement for making the guide vanes 24 and 26 in outlet passage 23 reversible and closing louvers 29, provides a dual stage high pressure ratio lower mass flow efficient high speed propulsion device for cruise.

In order to avoid reingestion, while not absolutely necessary, it is preferable, that a separator 30, be provided between the two fluid streams, i.e., between the upper turbine discharge opening 19 and fan outlet passage 23 below it. The separator functions primarily during the VTO operation when passage 23 acts as an inlet passage. During cruise the two streams may mix without any adverse effect both providing thrust although the large thrust comes from the fan stream in passage 23. As shown, during the VTO operation the separating means 30 preferably extends downstream of the periphery of the outlet passage 23 to keep the hot gas exhaust stream well away from passage 23.

The convertible radial flow fan as described, will be seen to be a very thin device presenting a low frontal area in the preferred tip turbine arrangement shown on the top of the disk. As such, with suitable gas generators located to provide a motive fluid, the complete device may be attached to existing aircraft to add a VTOL mode of operation to the aircraft.

FIGS. 4 and 5 illustrate generally how such a device might be added in outline form to a typical DC4 or DC6 type aircraft. In other words, the whole radial flow fan unit structure 12 may be supported as shown below the wings 31 as well as one below the nose of the fuselage. The triangular arrangement of course provides for attitude control. Gas generators 32 may feed the scroll 16 of the invention and are merely schematically shown in FIG. 4. It is to be noted that the advantage of the device is the small frontal area as evidenced in FIG. 5 wherein the three structures 12 add not much more than the thickness of the wings and may easily be attached to an existing airframe structure since the invention requires no alteration and no flow through any airframe structure. All the flow is radial into the structure 12 and either out duct 19 and passage 23 for cruise or radially in and out opening 28 for vertical augmentation. Both modes of operation require no alteration or substantial change in the airframe structure.

It will thus be seen that the convertible fan meets the mutually exclusive conditions by its shifting arrangement so that it can efficiently operate, with the same structure, as a high mass flow low pressure ratio device for vertical lift by taking in airflow substantially completely radially around the fan, compressing it once and exhausting it through opening 28. At the same time, by reversing the position of the guide vanes in the downstream passage a dual compression or high pressure ratio low mass flow is obtained for high speed forward flight as the mass flow now enters only the forward portion of the fan.

While there has been described preferred forms of the invention, obvious modifications and variations are possible in light of the above teachings. It is therefore to be understood that within the scope of the appended claims, the invention may be practiced otherwise than as specifically described.

I claim:
1. A convertible radial flow fan for attachment to an aircraft for vertical and cruise propulsion comprising,
   a disc supported for rotation on an axis vertical with respect to the aircraft,
   means connected to rotate said disc,
   a peripheral row of vertically attached impulse compressor blades on said disc,
   a stationary casing enclosing said disc and having diametrically opposed segment inlet and outlet passages to said blading,
   outlet guide vanes in said passages,
   said vanes in the outlet passage being movable,
   movable inlet guide vanes in at least said outlet passage,
   said fan providing cross flow two stage compression from said inlet passage through said outlet passage for horizontal thrust,
   a louver controlled vertical opening in said casing disposed centrally below said disc,
   said guide vanes in said outlet passage being movable more than 80° whereby said outlet guide vanes therein become inlet guide vanes and vice versa to provide single compression radial inflow through said passages and discharge through said vertical opening for vertical thrust.

2. Apparatus as described in claim 1 wherein said segment passages extend substantially between a 90° and 180° portion of the disc periphery.

3. Apparatus as described in claim 1 wherein said guide vanes are mounted on said casing.

4. Apparatus as described in claim 1 wherein inlet guide vanes are disposed in said inlet passage.

5. Apparatus as described in claim 1 wherein said means connected to rotate said disc comprises a peripheral row of turbine buckets on the opposite side of said disc and means directing exhaust gas through said buckets.

6. Apparatus as described in claim 5 having a discharge opening from said turbine buckets above said outlet passage and separating means between said discharge opening and outlet passage.

7. Apparatus as described in claim 5 having a scroll with nozzles therein peripherally about said turbine buckets directing said exhaust gas.

8. Apparatus as described in claim 6 wherein said separating means extends downstream of the periphery of said outlet passage.

No references cited.

MARK NEWMAN, *Primary Examiner.*

C. R. CROYLE, *Assistant Examiner.*